United States Patent [19]

Hart

[11] 4,321,250

[45] Mar. 23, 1982

[54] RHODIUM-CONTAINING PEROVSKITE-TYPE CATALYSTS

[75] Inventor: Peter J. Hart, Bartlesville, Okla.

[73] Assignee: Phillips Petroleum Company, Bartlesville, Okla.

[21] Appl. No.: 177,316

[22] Filed: Aug. 12, 1980

Related U.S. Application Data

[63] Continuation of Ser. No. 96,718, Nov. 21, 1979.

[51] Int. Cl.$^3$ ............................................. C01B 1/18
[52] U.S. Cl. .................................................. 423/652
[58] Field of Search ............... 252/462; 423/593, 651, 423/652

[56] References Cited

U.S. PATENT DOCUMENTS 2,135,058  11/1938  Spicer et al. ..................... 423/652
4,049,583   9/1977  Lauder ............................. 252/462
4,126,580  11/1978  Lauder ............................. 252/462

Primary Examiner—O. R. Vertiz
Assistant Examiner—Wayne A. Langel

[57] ABSTRACT

A catalyst of the perovskite-type $ABO_3$ crystal structure with from about 1 up to about 20 percent of the B cation sites occupied by rhodium ions and the remainder of the B cation sites occupied by ions consisting essentially of cobalt and the A cation sites occupied by lanthanide ions of atomic number 57 to 71 and ions of at least 1 metal of Groups IA, IIA or IVA of the Periodic Table having ionic radii of about 0.9 A to 1.65 A, and proportioned so that no more than 50 percent of the cobalt ions are tetravalent and the remaining cobalt ions are trivalent. The above-described catalyst on a refractory support. A method for producing hydrogen by reacting hydrocarbon in the presence of a catalyst as described above, either with or without a refractory support, by partial oxidation or steam reforming.

4 Claims, No Drawings

RHODIUM-CONTAINING PEROVSKITE-TYPE CATALYSTS

This application is a continuation application of co-pending application Ser. No. 096,718, filed Nov. 21, 1979.

BACKGROUND OF THE INVENTION

This invention relates to catalysts useful for partial oxidation and steam reforming. In one of its aspects it relates to perovskite-type catalysts. In another aspect it relates to rhodium-containing catalysts.

Three methods for obtaining hydrogen by reforming hydrocarbons are discussed in Kirk-Othmer's "Encyclopedia of Chemical Technology", 2nd edit., supplemental vol., p. 390. These are (1) partial oxidation: $C_nH_{2n}+n/2O_2+nH_2O \rightarrow 2nH_2+nCO_2$; (2) steam reforming: $C_nH_{2n}+2nH_2O \rightarrow 3nH_2+nCO_2$; (3) thermal cracking: $C_nH_{2n} \rightarrow nC+nH_2$. This invention discloses the production of hydrogen by the first two of these methods—partial oxidation and steam reforming. The catalyst—a perovskite-type crystalline composition containing rhodium—has the unexpected property of maintaining its activity in the presence of an appreciable concentration of sulfur.

It is therefore an object of this invention to provide a catalyst of the perovskite-type containing rhodium. It is another object of this invention to provide a catalyst useful in partial oxidation and steam reforming reactions in the presence of sulfur contamination of the reactants.

Other objects, aspects, and the various advantages of this invention will be apparent upon reading this specification and the appended claims.

STATEMENT OF THE INVENTION

The present invention is directed to novel metal oxide compounds having the perovskite-type structure characterized by B site cations predominantly of cobalt in the trivalent state with minor amounts of rhodium. Preferably the trivalent cobalt is mixed with cobalt in the tetravalent state.

The compositions have the perovskite $ABO_3$ crystal structure wherein from about 1 up to 20% of the B cation sites are occupied by rhodium ions and the remainder of the B cation sites are occupied by ions consisting essentially of cobalt ions, and the A cation sites are occupied by lanthanide ions of atomic number 57 to 71 and ions of at least one metal of Group IA, IIA, or IVA of the Periodic Table having ionic radii of about 0.9 A to about 1.65 A. The types of A cations being proportioned so that not more than 50% of the cobalt ions are tetravalent, the remainder being trivalent. Preferably at least 5% of the cobalt ions are tetravalent.

The metal oxide compounds described herein are oxides of the general empirical formula $ABO_3$ (equivalent to $A_2B_2O_6$, $A_3B_3O_9$, etc.) containing substantially equal numbers of cations of two different types of metals, called herein metals of Type A and metals of Type B, and at least two different metals of each of the two types. They can be considered oxides of the formula $[A^1A^2 \ldots A^i][B^1B^2 \ldots B^j]O_3$ in which the total number of ions, $A^1, A^2, \ldots A^i$, is substantially equal to the total number of ions, $B^1, B^2, \ldots B^j$, and in which there are at least two different metals $A^1$ and $A^2$ of Type A and at least two different metals $B^1$ and $B^2$ of Type B. When in the ideal perovskite structure, such oxides contain cations of appropriate relative sizes and coordination properties and have cubic crystalline forms in which the corners of the unit cubes are occupied by the larger Type A cations (each coordinated with 12 oxygen atoms), the centers of the cubes are occupied by the smaller Type B cations (each coordinated with six oxygen atoms), and the faces of the cubes are occupied by oxygen atoms. Many variations and distortions of this fundamental cubic crystal structure are known among materials commonly considered to be perovskites or perovskite-like. Among the terms which have been used to describe variations of the cubic crystal structure of perovskite and perovskite-like metal oxides are rhombohedral, orthorhombic, pseudocubic, tetragonal, and pseudotetragonal.

The preferred compositions can be formulated

$$[Sr_xLa_{1-x}][Co_{1-y}Rh_y]O_3$$

wherein y is about 0.01 to 0.2 and x is selected to give 5 to 50% of the cobalt ions in the tetravalent state. When, for example, $x=0.2$ the concentration of rhodium in the perovskite structure can range from 0.44 to 8.43 wt. percent.

The catalyst of this invention is preferably employed as a coating on a refractory support. The ratio in which the perovskite catalyst is combined with the refractory support can vary considerably while maintaining a composition of suitable activity. However, a preferred concentration range of rhodium in the finished catalyst is between about 0.05–1.0 wt. percent.

Suitable supports can be composed solely or primarily of silica, of ceramic compositions having softening or melting temperatures above the temperatures involved in forming or coating these catalytic compositions on such supports, of natural silicious materials such as diatomaceous earths and pumice, as well as of alundum, gamma alumina, silicon carbide, titania, zirconia, and other such refractory materials.

According to this invention, the production of hydrogen from hydrocarbon feedstock is effected by partial oxidation and/or steam reforming. The equations given above to describe the reactions show only hydrogen and carbon dioxide as reaction products. In actual practice the reactions are equilibrium limited and an appreciable concentration of carbon monoxide will be present in the product. This carbon monoxide can be converted to an equivalent quantity of hydrogen by the water gas shift reaction ($CO+H_2O \rightleftarrows CO_2+H_2$); accordingly, the reactions of the instant invention are assumed to be complete if only application of the water gas shift is required to complete them.

Materials that can be reformed by the process of this invention include petroleum products and products from extraction and/or liquefaction of coal and lignite, from tar sands, from shale oil, etc. This includes naphtha, distillates, gas oil (205°–538° C.), topped crude (343° C.+), and residuum. Preferably these materials should be free from metals, e.g., iron, vanadium, nickel, that accumulate on the catalyst and impair its performance.

Determination of proper process conditions, i.e., pressure, temperature, residence time, is dependent upon the feedstock. Light naphthas of high purity such as pentanes and hexanes can be steam reformed at relatively low temperatures and relatively high pressures at relatively high feed rates (short contact time). In contrast, heavier feedstock requires partial oxidative reforming to prevent coking the catalyst. This kind of feed requires relatively high temperature and relatively low pressures. The presence of sulfur in the feedstock does not destroy the activity of the catalyst as it does so frequently with, e.g., nickel catalysts but it does have a perceptible effect on the catalyst. This effect is to reduce the water gas shift, and hence to reduce the yield of hydrogen from the reforming process. In addition the presence of excessive concentrations of sulfur tends to favor the production of methane. These effects of sulfur on the process are reversed promptly when its concentration is reduced. Although the presence of sulfur has a perceptible effect on one aspect of the activity of the rhodium containing catalyst examples cited below show that at least several tenths of a percent and probably at least one weight percent of sulfur can be tolerated without destruction of catalytic activity.

The temperature for reforming can range between about 600°–1000° C., and even higher. Preferably it will range between about 650°–875° C.

The pressure for the reforming process can range between about $10^4$ to $5.2 \times 10^6$ Pa; preferably it will be between about $2.1 \times 10^5$ to $1.1 \times 10^6$ Pa. Formation of methane is favored by the use of increasing pressure.

The amount of steam combined with the hydrocarbon feedstock should be large enough to prevent the accumulation of carbon on the catalyst. Generally a ratio in the range of at least about 2.5 moles of steam per gram-mole of carbon (3.75 g water per gram of carbon) is sufficient. A higher ratio can be used but it is wasteful of energy to use more steam than is needed to complete the reforming reactions.

Steam reforming is a mildly endothermic reaction. To provide the energy that will maintain the required reaction temperature free oxygen-containing gas can be added to the hydrocarbon and steam reactants so that by oxidation sufficient heat will be released to maintain the proper catalyst temperature. The addition of free oxygen to the reactants can also help to prevent the accumulation of carbon on the catalyst. The amount of oxygen used can range up to a maximum of about 0.5 moles per gram-mole of carbon. Use of an excessive concentration of oxygen is to be avoided as it reduces the yield of hydrogen from the reforming process.

The gas hourly space velocity (GHSV) of all reactants, considered together, can range up to at least 15,000. As discussed above, preferred contact time is strongly dependent upon the properties of the feedstock being reformed.

This invention is illustrated by the following examples.

EXAMPLE I

Two different perovskite catalysts were prepared.

Catalyst A, having the formula $La_{0.8}Sr_{0.2}Co_{0.95}Rh_{0.05}O_3$, was made by dissolving 1.0 g $Rh(NO_3)_3.2\ H_2O$, 21.4 g $La(NO_3)_3.6\ H_2O$, 2.6 g $Sr(NO_3)_2$, and 17.1 g $Co(NO_3)_2.6\ H_2O$ in a minimum volume of water in a porcelain evaporating dish. The water was removed by evaporation and the dried salts were calcined in air for about 16 hours at 1000° C. The friable product was ground to a fine powder. It was shown by x-ray diffraction to have the perovskite crystal structure.

Catalyst B, having the formula $La_{0.8}Sr_{0.2}Co_{0.95}O_3$, was made by dissolving 21.43 g $La(NO_3)_3.6\ H_2O$, 2.6 g $Sr(NO_3)_2$, and 17.1 g $Co(NO_3)_2.6\ H_2O$ in a minimum volume of water in a porcelain evaporating dish. The water was removed by evaporation and the dried salts were calcined in air for about 16 hours at 1000° C. The product was ground to a fine powder.

Catalyst C was prepared by combining catalyst A with an alumina support, as follows. To 300 mL of aqueous solution containing 78.7 g of dissolved $Al(NO_3)_3.9\ H_2O$, 3.75 g of catalyst A was added. While this suspension was being stirring 7 N aqueous ammonium hydroxide was added slowly until all aluminum was precipitated (about pH 8). The mixture was filtered and the resulting filter cake was oven dried at about 120° C. overnight, then calcined in air for three hours at about 870° C. The resulting product contained, by calculation, 0.56 wt. percent rhodium.

Catalyst D was prepared by suspending 3.75 g of catalyst B in an aqueous solution containing 78.7 g $Al(NO_3)_3.9\ H_2O$ and was precipitated, filtered, dried, and calcined as described in the preceding paragraph. The resulting product contained essentially the same concentration of lanthanum, strontium, and cobalt as catalyst C. It contained no rhodium.

Catalyst E was prepared by combining 1.0 g of powdered catalyst A with 78.7 g of dissolved $Al(NO_3)_3.9\ H_2O$ and was precipitated, filtered, dried, and calcined as described for the two preceding catalysts. The resulting product contained, by calculation, 0.185 wt. percent rhodium.

Catalyst F was a modification of catalyst C. To a suspension of 3.75 g of catalyst A in about 320 mL of solution that contained 78.7 g of dissolved $Al(NO_3)_3.9\ H_2O$ were added 0.14 g of $Ca(OH)_2$ and 0.29 g of $Al(OH)_3$ before the addition of the ammonium hydroxide precipitant. Filtration, drying, and calcining were as for catalysts C, D, and E. Addition of slaked lime and aluminum hydroxide prior to the precipitation step made calcium aluminate that served as a cement to increase the strength of the finished catalyst granules.

Catalysts C, D, E, and F were used in reforming runs described in subsequent examples.

EXAMPLE II

Reforming runs were made in a tubular stainless steel reactor that was 0.8 cm i.d., contained 10 mL of $-10+40$ mesh catalyst, and was heated uniformly in a fluidized sand bath furnace. Steam was generated in a vaporizer above the reactor through which water was pumped in a calibrated pump. Separate provisions were made for introducing either isopentane or a much heavier feedstock to the reactor. Isopentane, like water, was vaporized in the vaporizer before entering the reactor. However the heavier feedstock tended to plug the vaporizer by coking, hence it was added to the steam directly above the reactor. Air (when used) was metered via a flow controller and joined other reactant vapors just above the reactor, through which they passed downflow. Effluent from the reactor was cooled in a condenser, then passed to a knockout vessel where liquid water was removed from gaseous products which passed through the sample loop of a GLC analyzer, was measured with a wet test gas meter after again being saturated with water vapor at ambient temperature and then was vented.

From complete analyses of the gaseous effluent and knowledge of the rates at which reactants were fed and products discharged, material balances were obtained that indicated the extent to which added steam participated in the reforming reaction. The quantity "hydrogen selectivity" was calculated on the basis of the hydrogen that was contained in the hydrocarbon feedstock, i.e., at total hydrocarbon conversion, 100% hydrogen selectivity means that all of the hydrogen in the hydrocarbon was converted to hydrogen gas. The quantity by which hydrogen selectivity exceeds 100% is a direct measure of the extent to which reactant steam has also been converted to hydrogen in the steam reforming reaction.

In the run of this example steam, isopentane, and air were reacted over 10 mL (8.8 g) of catalyst C; the run was of 250 hours duration but was not continuous. The effect of sulfur on the reaction was determined by the addition of 2 g carbon disulfide per liter to the water that was converted to steam in the vaporizer. Table I contains results from that run, both with and without sulfur being present, and at various reaction pressures and temperatures. The value of the carbon material balance is cited as an indication of the accuracy of the product analyses. This is mentioned because hydrogen, a significant component in the product, is difficult to measure accurately by GLC in the helium carrier gas.

Throughout the run hydrogen selectivity remained above 100%, demonstrating the activity of the catalyst both in the presence and the absence of sulfur for steam reforming.

TABLE I

| Sample | Time On Stream, Hr. | Temp., °C. | Pressure, $Pa \times 10^{-6}$ | Iso-Pentane GHSV | Mole Ratios | | | Carbon Bal., % | Hydrogen Select., % |
|---|---|---|---|---|---|---|---|---|---|
| | | | | | $Air:C_5$ | $O_2:C_5$ | $H_2O:C_5$ | | |
| I | 24.6 | 844 | 2.28 | 544 | 11.8 | 2.59 | 13.5 | 100.4 | 140 |
| II | 39.7 | 808 | 8.27 | 551 | 11.5 | 2.51 | 13.2 | 95.8 | 135 |
| III* | 49.2 | 816 | 2.28 | 522 | 11.7 | 2.55 | 14.4 | 99.3 | 143 |
| IV* | 123.6 | 863 | 7.93 | 591 | 11.4 | 2.49 | 11.6 | 100.0 | 102 |
| V | 189 | 866 | 2.55 | 559 | nil | nil | 14.0 | 101.4 | 201 |
| VI* | 237.6 | 865 | 8.96 | 527 | 11.9 | 2.33 | 13.7 | 100.1 | 103 |

*0.6 wt. % S as $CS_2$, based on isopentane, added

EXAMPLE III

A run similar to that of Example II was made, of 53 hours duration and also not continuous, in which 10 mL (8.17 g) of catalyst D was used. During this run the first 17 hours of operation were sulfur-free; the next 20 hours were with water containing 2 g/liter carbon disulfide; the final 16 hours again were sulfur-free. Table II contains results from this run.

In contrast with catalyst C that contained rhodium, this catalyst, which produced about 100% "hydrogen selectivity" with sulfur-free feed, produced about half the selectivity in the presence of the added sulfur.

TABLE II

| Sample | Time on Stream, Hr. | Temp., °C. | Pressure, $Pa \times 10^{-5}$ | Iso-Pentane GHSV | Mole Ratios | | | Carbon Bal., % | Hydrogen Select., % |
|---|---|---|---|---|---|---|---|---|---|
| | | | | | $Air:C_5$ | $O_2:C_5$ | $H_2O:C_5$ | | |
| VII | 4.2 | 802 | 2.90 | 591 | 10.9 | 2.40 | 11.5 | 96.8 | 95.1 |
| VIII | 8.5 | 889 | 2.96 | 603 | 10.5 | 2.32 | 12.2 | 98.6 | 108.8 |
| IX* | 18.8 | 891 | 2.96 | 800 | 11.4 | 2.49 | 9.3 | 92.8 | 43.2 |
| X* | 36.4 | 872 | 8.27 | 512 | 12.3 | 2.69 | 14.6 | 93.4 | 48.0 |
| XI | 38.2 | 858 | 10.0 | 429 | 11.2 | 2.45 | 17.1 | 96.3 | 99.5 |
| XII | 48.5 | 869 | 8.27 | 562 | 11.2 | 2.46 | 13.3 | 99.1 | 100.9 |

*0.6 wt % S as $CS_2$, based on isopentane, added

EXAMPLE IV

A run similar to that of example II was made, of 116 hours duration and also not continuous, in which 10 mL (9.49 g) of catalyst E was used. During this run the first 55 hours of operation were sulfur-free; the next 33 hours were with water containing 2 g/liter carbon disulfide, the next 26 hours were again sulfur-free; the final two hours were with sulfur. Table III contains results from this run.

Throughout the run hydrogen selectivity remained above 100%, demonstrating that a rhodium concentration as low as 0.185% when it is incorporated in a perovskite lattice is an active catalyst for steam reforming even in the presence of sulfur.

TABLE III

| Sample | Time On Stream, Hr. | Temp., °C. | Pressure, $Pa \times 10^{-5}$ | Iso-Pentane GHSV | Mole Ratios | | | Carbon Bal., % | Hydrogen Select., % |
|---|---|---|---|---|---|---|---|---|---|
| | | | | | $Air:C_5$ | $O_2:C_5$ | $H_2O:C_5$ | | |
| XIII | 3.8 | 773 | 2.28 | 672 | 9.9 | 2.18 | 10.9 | 99.0 | 131.5 |
| XIV | 27.6 | 873 | 2.28 | 679 | 10.0 | 2.18 | 11.0 | 99.8 | 146.1 |
| XV* | 66.7 | 880 | 2.41 | 687 | 9.2 | 2.01 | 10.9 | 97.4 | 114.1 |
| XVI* | 85.5 | 876 | 2.28 | 604 | 9.8 | 2.14 | 12.3 | 100.1 | 118.5 |
| XVII | 113.6 | 853 | 8.27 | 638 | 9.7 | 2.13 | 11.5 | 98.6 | 144.7 |

*0.6 wt. % S as $CS_2$, based on isopentane, added

EXAMPLE V

A run made in the same manner as those described in examples II, III, and IV were made, using, instead of isopentane, a fuel oil that is characterized in Table IV.

TABLE IV

| | |
|---|---|
| API gravity at 60° F. | 33.1° |
| Initial boiling point, °C. | 179 |
| Elemental analysis, wt. % | |
| C | 86.84 |
| H | 12.78 |
| N | 0.0 |
| O | 0.08 |
| S | 0.30 |

This run continued for over 150 hours and was terminated voluntarily. It was made with 10 mL (7.6 g) of catalyst F. Although the fuel oil being fed to the reactor contained 0.30 wt. percent sulfur. During part of the run the concentration of sulfur was increased further by using water containing 2 g/liter of carbon disulfide as the source of steam. Table V contains results from this run.

TABLE V

| Sample | Time on Stream, Hr. | Temp., °C. | Pressure, Pax$10^{-5}$ | Fuel Oil LHSV | Oxygen GHSV | Steam GHSV | Carbon Bal, % | Hydrogen Select., % |
|---|---|---|---|---|---|---|---|---|
| XVIII | 0.6 | 874 | 1.86 | 1.51 | 1097 | 6973 | 99.8 | 174 |
| XIX | 64.1 | 876 | 2.07 | 1.54 | 1143 | 7028 | 97.9 | 155 |
| XX* | 101.0 | 871 | 2.41 | 1.54 | 1207 | 6519 | 100.1 | 153 |
| XXI | 135.3 | 870 | 1.86 | 1.55 | 1153 | 6983 | 95.1 | 153 |

*Sulfur concentration in reactor increased from 0.30 wt. % to about 0.65 wt. %., based on the fuel oil, by addition of $CS_2$ dissolved in the water.

This run shows that the rhodium-containing perovskite composition of this invention that has been physically strengthened by addition of calcium aluminate to the gel in which the catalyst is supported is effective to reform hydrocarbon that is much heavier than isopentane, and retains its activity in the presence of a significant concentration of sulfur without producing any significant deposition of carbon or coke on the catalyst.

I claim:

1. A method for producing hydrogen comprising contacting steam and a hydrocarbon feedstock at steam reforming conditions including a temperature of between about 600° to 1000° C. and a pressure of between about $10^4$ to $5.2 \times 10^6$ Pa in the presence of sulfur-containing contaminant with a catalyst that is a compound having the perovskite-type $ABO_3$ crystal structure wherein from about 1 to up to 20% of the B cation sites are occupied by rhodium ions and the remainder of the B cation sites are occupied by ions consisting essentially of cobalt ions, and the A cation sites are occupied by lanthanide ions of atomic number 57 to 71 and ions of at least one metal of Groups IA, IIA and IVA of the Periodic Table having ionic radii of about 0.9A to 1.65, and proportioned so that at least 50% of the cobalt ions are trivalent.

2. A method of claim 1 wherein said catalyst is supported on a refractory material.

3. A method of claim 2 wherein free oxygen is present in an amount up to about 0.5 moles per gram-mole of carbon present.

4. A method of claim 1 wherein free oxygen is present in an amount up to about 0.5 moles per gram-mole of carbon present.

* * * * *